Figure 1:
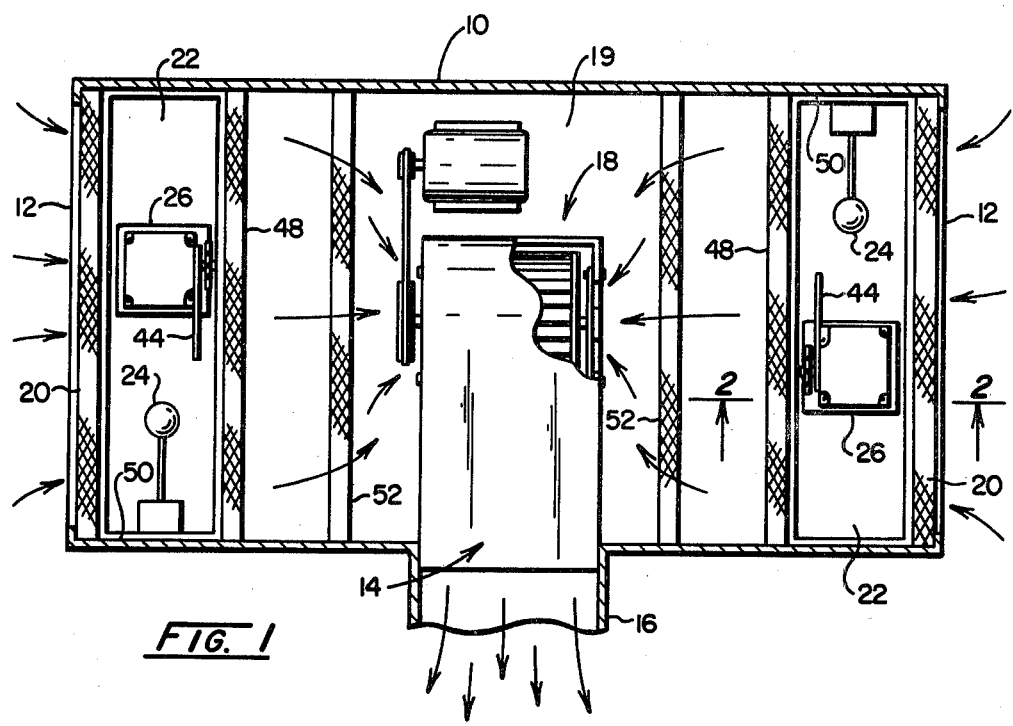

United States Patent [19]

Schlachet

[11] 4,452,615

[45] Jun. 5, 1984

[54] AIR CONDITIONING SYSTEM

[75] Inventor: Hugo Schlachet, Cleveland Heights, Ohio

[73] Assignee: Bessam Manufacturing Company, Bedford Heights, Ohio

[21] Appl. No.: 407,310

[22] Filed: Sep. 22, 1982

[51] Int. Cl.³ .................................... B01D 47/00
[52] U.S. Cl. .................................... 55/227; 55/230; 55/259; 261/90; 261/92
[58] Field of Search ............... 55/90, 227, 230–232, 55/247, 259; 261/84, 89, 90, 91, 92

[56] References Cited

U.S. PATENT DOCUMENTS

| | | | |
|---|---|---|---|
| 950,607 | 3/1910 | Baldwin | 55/90 |
| 1,462,363 | 7/1923 | Christensen . | |
| 1,503,755 | 8/1924 | Harrison . | |
| 1,803,792 | 5/1931 | Christensen . | |
| 1,824,891 | 9/1931 | Hill | 55/230 |
| 1,848,202 | 3/1932 | Scott | 261/92 |
| 2,105,887 | 1/1938 | Langford . | |
| 2,175,779 | 10/1939 | Mohrdieck | 55/230 |
| 2,339,982 | 1/1944 | Dalton . | |
| 2,365,483 | 12/1944 | Mode | 261/92 |
| 2,428,842 | 10/1947 | Feinberg | 261/36 |
| 2,437,936 | 3/1948 | Carraway | 261/92 |
| 2,495,538 | 1/1950 | Mousel | 261/92 |
| 2,841,369 | 7/1958 | Carraway | 257/37 |
| 3,672,126 | 6/1972 | Goettle | 55/227 |
| 3,719,353 | 3/1973 | Cherne et al. | 261/90 |
| 3,798,881 | 3/1974 | Schwarz et al. | 55/230 |
| 3,802,158 | 4/1974 | Ohle | 55/259 |
| 3,948,627 | 4/1976 | Schwarz et al. | 261/92 |
| 4,299,601 | 11/1981 | Schlachet | 55/230 |

Primary Examiner—Bernard Nozick
Attorney, Agent, or Firm—Millard & Cox

[57] ABSTRACT

A housing for air-conditioning apparatus includes an inlet and an outlet. A controlled level of water in the bottom of the housing serves as a reservoir for a rotating disc which flings a curtain of water across the interior of the chamber in the flow path of the air passing from the inlet to the outlet. Three foraminous walls filter and mix the air with one wall upstream of the rotating disc and two downstream.

17 Claims, 4 Drawing Figures

AIR CONDITIONING SYSTEM

FIELD OF THE INVENTION

This invention is involved with cooling, filtering and washing air or possibly other gases, primarily in an industrial environment.

BACKGROUND OF THE INVENTION

Using water to spray across the flow path of a gas, particularly air, as it traverses a housing or chamber for the purpose of filtering, washing and cooling the gas takes many forms. In some cases nozzles are mounted around the periphery of the chamber to spray water toward its center. In other cases, a foraminous wall receives water sprayed or trickled from above such that it flows downward by gravity as the gas passes therethrough. Additionally, numerous patents disclose a rotating drum, cylinder or disc mounted either parallel or perpendicular to the flow of gas. The rotating drum, etc. flings water in a pattern across the flow path of gas passing through the chamber and the water tends to clean and cool the air.

There are three basic types of rotary spraying apparatus known in the art, namely smooth cylinders, smooth discs, and patterned or toothed discs; the latter comprise discs bearing projections extending out of the plane of the discs.

Smooth cylinders are bulky and so heavy that they are difficult to balance on a shaft revolving at high speed. In addition, since the water or other liquid being sprayed only adheres to the surface of the cylinder by surface tension, the quantity of water sprayed by a smooth cylinder is small relative to the large power needed to rotate a heavy cylinder at high speed.

Smooth discs are lighter and easier to balance than smooth cylinders but spray only a small amount of water. Accordingly, a very large number of discs may be necessary where large quantities of water have to be sprayed.

Toothed discs spray far more water than smooth discs because the projections act as scoops lifting water out of the bath. Unfortunately, the spray produced by known apparatus using toothed discs lacks uniformity, both as regards to the sizes of individual droplets within the spray and the angular dispersion of the spray.

SUMMARY OF THE INVENTION

This invention includes a housing or chamber with an inlet to receive air or other gas and a discharge outlet which may or may not be connected to a duct system for distributing discharged gas to various locations.

Where the word "air" is used subsequently it is understood that while the preferred embodiment involves cleaning, filtering and cooling air, the apparatus could be used with other gases.

Between the inlet and outlet are three foraminous walls, a fan motor to pull air through the foraminous walls, a motor for rotating a disc mounted on a shaft extending therefrom and a pool of water located in the bottom of the chamber into which the disc dips to collect and fling water in the form of droplets to form a curtain across the flow path of the air between the inlet and the outlet.

One foraminous wall is located near the inlet of the chamber to minimize the dirt which might be drawn into the system. In an industrial application the apparatus may be installed on a roof or on the ground adjacent a parking lot. The need to minimize the incursion of dirt into the system is obvious from the variety of installation sites which may be anticipated.

The rotating disc which forms the curtain of air droplets is located downstream of the first filter. The next filter in the flow path is called a "wet" filter because it is in relatively close proximity to the rotating disc and it will inherently have some water droplets impinge thereon. The wet filter is designed to prevent large droplets of water from being entrained in the air flow and drawn into the treated air distribution system as droplets.

The third foraminous wall or filter is called a "dry" filter and it serves to inter-mix the cooled air to a greater degree and promote the homogeneity of the air before it passes to the distribution system and promotes uniformity as to humidity and temperature as it passes on to the blower motor which is located downstream of the dry filter.

The rotating disc is relatively small in diameter. It includes six vanes on its downstream side which extend linearly in a radial direction to near the periphery of the disc where the vanes bend backward away from the direction of rotation. This backward bending at the periphery allows the water which is being propelled radially by the rotating disc to flow around the bend and down the slope of the vane until it gets to the periphery of the disc and the edge of the sloped vane at the same time. Upon arriving at the termination point, the water which will have slowed in its velocity as well as its acceleration during the time it flows on the sloped part of the vane will be accelerated again at that point which tends to atomize the water into smaller droplets than would otherwise be the case if the vane was linear to the very edge of the disc.

Objects of the invention will be clear from a review of the drawings described below and the detailed description of the preferred embodiment which follows.

BRIEF DESCRIPTION OF THE DRAWINGS

FIG. 1 is a top plan view in section of a chamber which houses the components for cooling, cleaning and filtering air according to this invention;

FIG. 2 is a fragmentary sectional view taken along line 2—2 of FIG. 1;

FIG. 3 is a perspective view of the motor, rotor and shield which serves to spray the curtain of water droplets within the chamber; and FIG. 4 is an exploded view the motor, rotar and shield of FIG. 3.

DETAILED DESCRIPTION OF THE PREFERRED EMBODIMENT

The invention involves the cooling, washing and filtering of air and the apparatus to accomplish this is housed in a chamber 10 having a pair of inlets 12 and an outlet 14. In the illustrated embodiment the outlet has a duct system 16 attached thereto which may direct the treated air to desired locations in an industrial plant or factory but the ducting system itself is not always necessary. The outlet 14 could lead directly into the plant area itself without any duct system being attached at all.

For ease of description hereinafter, only one side of the apparatus of FIG. 1 will be described. As shown, each of the two inlets 12 provides identical apparatus in a flow path which leads to the single outlet 14. Therefore only one flow path requires description for a full understanding of the invention. The preferred embodiment is as illustrated comprising two inlets leading to a single outlet but a single inlet is within the scope of the inventive concept.

An air blower system 18 is illustrated as a squirrel cage which is conventional but the particular kind of blower system is not critical. The blower system 18 is located in a plenum chamber 19 which serves to collect cooled humidified air from both halves of the inlet system. However, it is desired that the blower system be located immediately upstream of the outlet 14 in the flow path within the chamber 10. It has been found that pulling the air through the foraminous walls or filters (to be described later) is far more efficient than where the blower directs air against the foraminous wall in an effort to push it through the filter.

A first filter 20 is mounted in the area of the inlet 12 for purposes of preventing large particles of dirt and debris from entering the chamber 10. Air drawn from the interior of a factory building or immediately surrounding the same tends to have a larger percentage of dust and dirt particles than is desirable. Therefore the first filter 20 should be changed periodically as it will tend to become clogged over use in a few days or weeks.

Immediately inside the filter 20 is a water reservoir 22 which, in the preferred embodiment is filled to a depth of about two and one-half inches. Its level 23 is controlled by a float 24 which is a conventional device for controlling the feed of water to a reservoir. The float 24 maintains the water at approximately a constant two and one-half inch level. About two-thirds of the way from one side of the chamber in the bottom of the water reservoir is a frame 26 which is generally rectangular in shape and it is designed to receive and releasably hold the tapered, downwardly converging, outer surface of a motor housing 28. The housing 28 is releasably held within the frame 26 by dimples 30 which have been deformed inwardly from the upwardly extending flanges 32 of the frame.

The frame itself may be constructed from pieces of angle iron welded together prior to the time it is welded to the bottom of the water reservoir. When the motor housing 28 is pushed downward into the rectangle bounded by the frame, the dimples 30 will engage the housing surface and the flanges 32 will flex ever so slightly. Thus, the point contact supplied by the dimple will place flange 32 in tension with the dimple 30 pushing against the surface of the motor housing which will hold it in position when the apparatus is in operation.

Figure 2:
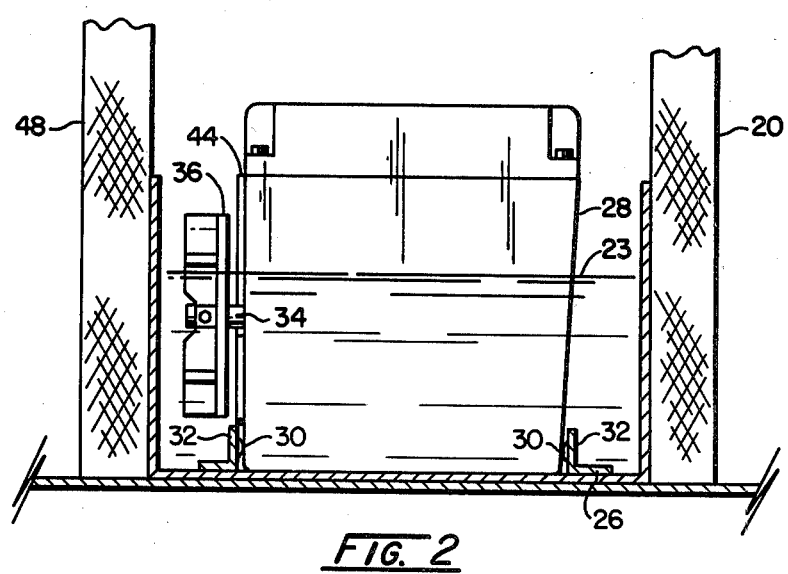
Figure 3:
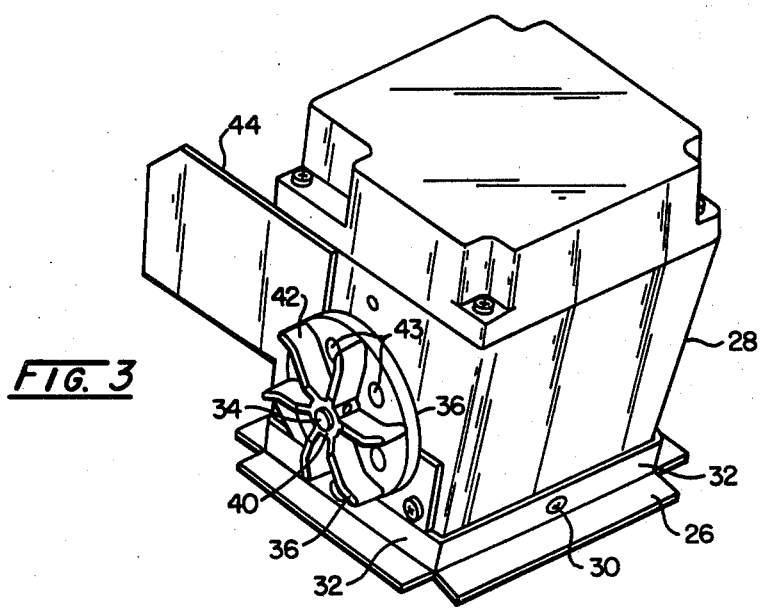
Figure 4:
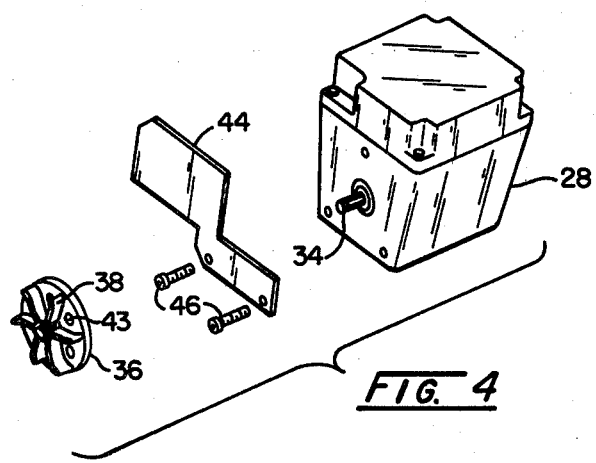

A shaft 34 projects from the housing 28 and mounted on the shaft is a two and three-eighths inch diameter disc 36. It will be observed in FIG. 2 that the axis of the shaft is about one-half inch below the surface of the water.

On the surface of the disc 36, facing away from the motor housing 28 are six radially extending vanes 38 which project radially from a central hub 40 toward the periphery of the disc. About one-eighth of an inch from the periphery of the disc, the vanes bend backward away from the direction of rotation of the disc to form a sloped section 42 which extends to the periphery of the disc. The purpose of the sloped section 42 is to increase the uniformity of droplets flung from the periphery of the disc. What happens to the water as it flows radially along the surface of the vane 38 is that it is increasing in acceleration and velocity; but when it reaches the break point between the linear section of the vane and the sloped section 42 it has a momentary decrease in acceleration and velocity; and then when it reaches the very periphery of the disc it is again accelerated which tends to serve as an atomizer and provide a uniform spray of droplets from the disc periphery.

The disc 36 is designed to rotate in a substantially vertical plane and substantially perpendicular to the direction of air flow at that point in the chamber. Also, apertures 43 extend through the disc and collect water while submerged for discharge along vanes 38 during the droplet formation phase of the cycle.

Mounted on the motor housing 28 is a shield 44 held in place by a pair of screws 46. The shield is mounted such that it is between the housing and the disc and thereby upstream of the disc. As water is flung from the periphery of the disc, some droplets which are relatively large in size will move in a direction generally upstream toward the first filter 20. This will not be beneficial to the overall system because the resulting wetness would both increase the caking and collection of dirt on filter 20 and it would increase the resistance to air flow through the system (requiring a more powerful blower system 18). The shield 44 is located such that the large majority of such droplets will impinge thereon and be directed upwardly and toward the wet filter 48. Additionally, the shield breaks the large droplets into smaller ones when they rebound which helps in making a uniform dispersion of droplets across the chamber.

It will be observed that the shield extends only on one side of the motor and it is the side which corresponds to the part of the disc first breaking the surface 23 and which would have random droplets flung in more diverse directions than directly radially of the periphery of the disc. It will also be observed that the side of the disc which first emerges from the water has the most space radially for flinging said water. That is, the axis of the shaft 38 is about two thirds the distance from side 50 of the chamber 10 and the side of the disc 36 which first emerges from the water in its rotation is nearest to side 50 of the chamber. It has been found that with this location and the proportions of droplets flung from the periphery of the disc, the location indicated provides the best degree of uniformity of the water curtain across the flow path.

As stated previously, immediately downstream of the disc 36 is a second foraminous wall or filter 48 which is called the wet foraminous wall for the reason that water droplets which are not evaporated by the passing stream of air are often drawn into contact with the wall 48 and then tend to trickle down and return to the water in the reservoir 22. This trickling down motion also has the benefit of increasing the uniformity of humidity and temperature in the cooling of the air.

A third foraminous wall known as the dry foraminous wall 52 is next in the flow path of the air and it is so called because most of the water droplets are filtered out by the wet wall 48. The dry wall serves the purpose of intermixing the air and making it more uniform as to temperature and humidity before it goes to the squirrel cage blower 18 and is discharged into the plant area.

Having thus described the invention in its preferred embodiment it will be clear that modifications may be made without departing from the spirit of the invention. However, it is not intended that the drawings shown or the words used to describe the same be in any way limiting on the invention. Rather it is intended that the invention be limited only by the scope of the appended claims.

I claim:

1. In an apparatus for filtering, washing and cooling gas, the combination including:

means forming a chamber, inlet means for admitting gas to said chamber, and outlet means for conducting gas away from said chamber, a wet foraminous wall within said chamber extending transverse to the direction of gas flow and through which gas passes in its trip from the inlet means to the outlet means, a pool of water disposed in the bottom of said chamber, means for controlling the upper surface level of said water, said water being of a depth controlled by said controlling means, means for forcing gas through said foraminous wall and means for spraying a curtain of water from said pool across the chamber between the inlet means and the wall, said sprayed water serving to filter, wash and cool gas within said chamber, said foraminous wall serving to prevent entrainment of large droplets of water in the stream of gas passing therethrough, the means for spraying water including a single disc rotatable in one direction about an axis, said rotation being in a plane substantially vertical and substantially perpendicular to the direction of flow of said gas, said disc having a plurality of radially extending vanes projecting from one side thereof and a plurality of apertures therethrough, the lowest portion of said disc being covered with said water, drive means for rotating said disc in one direction about its axis, a shield mounted adjacent said disc and extending radially thereof above the water level to deflect droplets of water flung from the periphery of the disc, said deflection being in a direction generally upward and toward the foraminous wall, said shield being nearest the portion of the disc which first emerges from the water in its rotation, means in the chamber for mounting the drive means adjacent the bottom of the chamber and holding the same in fixed position comprising a frame generally rectangular in form affixed to the bottom of said chamber and including upwardly extending flanges, at least two of said flanges including inwardly projecting dimples designed to engage a converging surface on said drive means to grip the same and releasably hold it in position during the rotation of the disc.

2. The apparatus of claim 1 wherein three foraminous walls are mounted in the flow path of the air, a first foraminous wall being mounted at the inlet to the chamber for filtering large particles from the air flowing into the chamber and for preventing dirt from collecting therein, the wet foraminous wall serving to collect large droplets of water and prevent them from flowing with the air into the distribution system downstream of the chamber, and a dry foraminous wall downstream of the wet wall serving to inter-mix the air and make it more homogeneous as to temperature and humidity before it is discharged from the chamber.

3. The apparatus of claim 1 wherein the drive means comprises an electric motor within a housing, projecting from said housing is a shaft on which the disc is mounted, the shield being mounted on the housing and located between the housing of the electric motor upstream and the disc, the housing being located nearer to the inlet than the disc.

4. The apparatus of claim 3 wherein three foraminous walls are mounted in the flow path of the air, a first foraminous wall mounted at the inlet to the chamber for filtering large particles from the air flowing into the chamber and for preventing direct from collecting therein, said wet foraminous wall serving to collect large droplets of water and prevent them from flowing with the air into the distribution system downstream of the chamber, and a dry foraminous wall downstream of the wet wall serving to inter-mix the air and make it more homogeneous as to temperature and humidity before it is discharged from the chamber.

5. The apparatus of claim 4 mounted in duplicate wherein air flows into the chamber from two inlets, air from each inlet flows past its curtain of water and the resulting air from both inlets is combined in a plenum chamber for discharge through the outlet opening.

6. The apparatus of claim 4 wherein the disc includes six vanes and six apertures so arranged on a disc as to be dynamically balanced during its rotation, the apertures serving to collect water when they are below the water surface and discharge it radially along the nearest vane when it rises above the level of the water in the chamber.

7. The apparatus of claim 1 wherein the disc includes six vanes and six apertures so arranged on the disc as to be dynamically balanced during its rotation, the apertures serving to collect water when they are below the water surface and discharge it radially along the nearest vane when it rises above the level of the water in the chamber.

8. The apparatus of claim 7 wherein each vane extends radially in a straight line to near the periphery of the disc where it bends backward away from the direction of rotation which facilitates the separation of water droplets from the rotating disc.

9. In an apparatus for filtering, washing and cooling gas, the combination including:

means forming a chamber, inlet means for admitting gas to said chamber, and outlet means for conducting gas away from said chamber, a wet foraminous wall within said chamber extending transverse to the direction of gas flow and through which gas passes in its trip from the inlet means to the outlet means, a pool of water disposed in the bottom of said chamber, means for controlling the upper surface level of said water, said water being of a depth controlled by said controlling means, means for forcing gas through said foraminous wall and means for spraying a curtain of water from said pool across the chamber between the inlet means and the wall, said sprayed water serving to filter, wash and cool gas within said chamber, said foraminous wall serving to prevent entrainment of large droplets of water in the stream of gas passing therethrough, the means for spraying water including a single disc rotatable in one direction about an axis, said rotation being in a plane substantially vertical and substantially perpendicular to the direction of flow of said gas, said disc having a plurality of radially extending vanes projecting from one side thereof and a plurality of apertures therethrough, the lowest portion of said disc being covered with said water, drive means for rotating said disc in one direction about its axis, a shield mounted adjacent said disc and extending radially thereof above the water level to deflect droplets of water flung from the periphery of the disc, said deflection being in a direction generally upward and toward the foraminous wall, said shield being nearest the portion of the disc which first emerges from the water in its rotation, means in the chamber for mounting the drive means adjacent the bottom of the chamber and holding the same in fixed position, the drive means comprises an electric motor within a housing, projecting from said housing is a shaft on which the disc is mounted, the shield being mounted on the housing and located between the housing of the electric motor and the disc, the housing being located nearer to the inlet than the disc, said shaft being submerged in the water during the time of the spraying of water, said shaft being aligned substantially parallel with the flow of air from the inlet to the outlet and being located about two-thirds of the way from one side of the chamber to the other and the direction of rotation of said disc being such that the rotating disc emerges from the water on the side of the shaft furthest from the side of the chamber.

10. The apparatus of claim 9 mounted in duplicate wherein air flows into the chamber from two inlets, air from each inlet flows past its curtain of water and the resulting air from both inlets is combined in a plenum chamber for discharge through the outlet opening.

11. The apparatus of claim 9 wherein the disc includes six vanes and six apertures so arranged on a disc as to be dynamically balanced during its rotation, the apertures serving to collect water when they are below the water surface and discharge it radially along the nearest vane when it rises above the level of the water in the chamber.

12. The apparatus of claim 9 wherein three foraminous walls are mounted in the flow path of the air, a first foraminous wall being mounted at the inlet to the chamber for filtering large particles from the air flowing into the chamber and for preventing dirt from collecting therein, the wet foraminous wall serving to collect large droplets of water and prevent them from flowing with the air into the distribution system downstream of the chamber, and a dry foraminous wall downstream of the wet wall serving to inter-mix the air and make it more homogenous as to temperature and humidity before it is discharged from the chamber.

13. The apparatus of claim 9 wherein each vane extends radially in a straight line to near the periphery of the disc where it bends backward away from the direction of rotation which facilitates the separation of water droplets from the rotating disc.

14. In an apparatus for filtering, washing and cooling gas, the combination including:

means forming a chamber, inlet means for admitting gas to said chamber, and outlet means for conducting gas away from said chamber, a wet foraminous wall within said chamber extending transverse to the direction of gas flow and through which gas passes in its trip from the inlet means to the outlet means, a pool of water disposed in the bottom of said chamber, means for controlling the upper surface level of said water, said water being of a depth controlled by said controlling means, means for forcing gas through said foraminous wall and means for spraying a curtain of water from said pool across the chamber between the inlet means and the wall, said sprayed water serving to filter, wash and cool gas within said chamber, said foraminous wall serving to prevent entrainment of large droplets of water in the stream of gas passing therethrough, the means for spraying water including a single disc rotatable in one direction about an axis, said rotation being in a plane substantially vertical and substantially perpendicular to the direction of flow of said gas, said disc having a plurality of radially extending vanes projecting from one side thereof and a plurality of apertures therethrough, the lowest portion of said disc being covered with said water, drive means for rotating said disc in one direction about its axis, a shield mounted adjacent said disc and extending radially thereof above the water level to deflect droplets of water flung from the periphery of the disc, said deflection being in a direction generally upward and toward the foraminous wall, said shield being nearest the portion of the disc which first emerges from the water in its rotation, means for mounting the drive means in the chamber adjacent the bottom of the chamber and holding the same in fixed position, said previously defined combination being mounted in duplicate wherein said air forcing means forces air flows into the chambers from the two inlets, air from each inlet flows past its curtain of water and the resulting air from both inlets is combined in a plenum chamber for discharge through the common outlet opening.

15. The apparatus of claim 14 wherein three foraminous walls are mounted in the flow path of the air, a first foraminous wall mounted at the inlet to the chamber for filtering large particles from the air flowing into the chamber and for preventing dirt from collecting therein, said wet foraminous wall serving to collect large droplets of water and prevent them from flowing with the air into the distribution system downstream of the chamber, and a dry foraminous wall downstream of the wet wall serving to inter-mix the air and make it more homogenous as to temperature and humidity before it is discharged from the chamber.

16. The apparatus of claim 14 wherein the disc includes six vanes and six apertures so arranged on a disc as to be dynamically balanced during its rotation, the apertures serving to collect water when they are below the water surface and discharge it radially along the nearest vane when it rises above the level of the water in the chamber.

17. The apparatus of claim 14 wherein each vane extends radially in a straight line to near the periphery of the disc where it bends backward away from the direction of rotation which facilitates the separation of water droplets from the rotating disc.

* * * * *